United States Patent Office 2,721,125
Patented Oct. 18, 1955

2,721,125
HERBICIDAL COMPOSITION

John C. R. Warren, Elmira, Ontario, Canada, assignor to United States Rubber Company, New York, N. Y., a corporation of New Jersey No Drawing. Application December 16, 1952,
Serial No. 326,366

4 Claims. (Cl. 71—2.6)

This invention relates to herbicidal compositions of matter and more particularly to such compositions of matter in which the active herbicidal ingredient comprises a mixture of ethyl and isopropyl esters of 2,4-dichlorophenoxyacetic acid (hereinafter designated as "2,4-D") and which are particularly characterized by their marked resistance to freezing at the low temperatures normally encountered by such formulations during transportation and storage.

A great demand has arisen in the United States and Canada for herbicidal compositions for the killing of weeds and undesirable brush. The demand has been especially great for such compositions in which the active herbicidal ingredient is an alkyl ester of 2,4-D. However, such ester formulations have presented a very serious problem because they solidify at the low atmospheric temperatures encountered in transportation and storage. Most of the ester formulations which have been sold heretofore have become solid due to freezing at temperatures well above the freezing point of water. Solidification because of freezing is highly objectionable to the trade for a number of reasons. The freezing and thawing are often thought to injure the formulation. It is usually necessary for the user to take positive steps to thaw the frozen formulation. Thawing is inconvenient and troublesome because of the difficulty of applying the necessary degree of heat to the containers in which the formulation is shipped. Also, it is often necessary to heat the frozen formulation to a temperature much higher than that at which it became frozen in order to convert it to the liquid condition. In addition, the freezing and thawing often cause a stratification of the contents of the container with the result that if the user withdraws a portion only the withdrawn portion has a different composition from the balance of the contents. As a result, it is necessary for the user to bring the entire contents of the vessel to liquid form and then to agitate the contents thoroughly before emptying the container.

The problem is particularly accentuated by the fact that it is customary in the herbicidal art for the manufacturer to ship the formulations to be used in a given growing season during the winter preceding that season so that the formulations are exposed to temperatures well below the freezing point of water and often below −20° C. for long periods of time with the result that if the formulations show any tendency to solidify by freezing they will become solid during such exposure.

As a result, the trade has refused to accept formulations which undergo solidification by freezing at prevailing winter temperatures. Some formulators have actually been forced to withdraw from the alkyl ester type of formulation because of their inability to overcome the freezing problem. Some manufacturers have attempted to overcome the freezing problem by introducing anti-freeze or "coupling" agents such as ethyl alcohol or higher alcohols into their alkyl ester formulations. But such attempts to solve the problem are unsatisfactory because of the expense of such agents and because of the fact that they reduced the concentration of active herbicidal material.

Other manufacturers have attempted to overcome the freezing problem with alkyl ester formulations of 2,4-D by replacing the petroleum hydrocarbon base oil commonly used in such formulations with aromatic hydrocarbon solvents such as toluene. However, such attempts have not been satisfactory because of the great expense of such aromatic hydrocarbon solvents, because of the undesirable phytoxicity of such solvents, and because there is a limit on the amount of such aromatic solvents which can be used. In explanation of the latter point it can be said that at the desired high concentrations of active ester, typically 50% or more, the freezing point of the formulation is excessively high; the desired low freezing point is attained only with relatively high amounts of solvent which correspond to undesirably low concentrations of active ester.

The principal object of the present invention is to provide a simple, highly effective and commercially feasible method of securing low freezing points in concentrated herbicidal compositions based upon alkyl esters of 2,4-D as the active herbicidal ingredient. Another object is to attain such low freezing points without the introduction of inactive material into the formulation. Another object is to accomplish the foregoing objects without resort to anti-freeze or coupling agents and without resort to such solvents as the above-mentioned aromatic hydrocarbon solvents. Another object is to solve the freezing problem and yet formulate with relatively cheap base oils such as the common petroleum hydrocarbon oils, e. g., fuel oil, kerosene, naphtha, Stoddard solvent, etc. Another object is to make it possible to prepare more concentrated formulations, i. e., formulations which are higher in active ester of 2,4-D and yet which give no difficulty from the standpoint of freezing. Numerous other objects of the present invention will appear to those skilled in the art.

I have discovered that the freezing problem can be overcome in a simple and highly effective manner, without reducing the activity of the formulation, and without introducing extraneous inactive materials into the formulation, by simply employing as the active herbicidal ingredient a mixture, in certain proportions, of the ethyl and isopropyl esters of 2,4-D. Specifically I have discovered that formulations in which the ester component comprises from 20 to 55% by weight of the isopropyl ester of 2,4-D and correspondingly from 80 to 45% of the ethyl ester of 2,4-D exhibits unusually high resistance to freezing at the low temperatures encountered in winter in Canada and in the colder parts of the United States.

The above percentages are based on the sum of the ethyl and isopropyl esters of 2,4-D. Mixtures consisting only of the ethyl and isopropyl esters in the stated proportions do not freeze even subjected to temperatures as low as 8° C. for prolonged periods of time and their resistance to freezing is still further enhanced by formulating with suitable amounts of conventional formulating oils such as petroleum hydrocarbon base oils. Other esters of 2,4-D as well as any esters of 2,4,5-trichlorophenoxyacetic acid may be used in conjunction with the specific ethyl-isopropyl 2,4-D ester mixtures of my invention.

Following are freezing data for mixtures of ethyl and isopropyl esters of 2,4-D:

| Per cent isopropyl ester: | Freezing point, ° C. |
|---|---|
| 0 | 14 |
| 20 | 8 |
| 35 | 2 |
| 40 | 2 |
| 50 | 6.5 |
| 65 | 13 |
| 80 | 19 |
| 100 | 27 |

The ethyl and isopropyl esters of 2,4–D used in determining the above data were distilled under reduced pressure to increase their purity after which they were subjected to freezing either alone or in the proportions shown in the table. To induce crystallization, all mixtures were seeded with crystals of the separate esters. As the minimum freezing point was approached, by proportioning the two esters, even this seeding failed to induce crystallization at a reasonable rate and therefore the mixtures were held at below —20° C. and agitated periodically over 2 to 6 days to cause solidification where possible. In all cases the ester or mixture was cooled until either solidification or maximum crystallization occurred. The temperature of the sample was then slowly raised and the mixture was agitated as soon as possible, noting the temperature at which the last crystals disappeared. It will be seen that extremely stringent conditions, far more so than are normally encountered, were employed to cause solidification of mixtures at and near the minimum freezing proportions.

All freezing points given in the above table are actual melting or clear points, i. e., the temperature at which the last crystals disappear after the sample has been caused to solidify as just described and then warmed. All points represent the highest temperature recorded upon melting these particular samples. In many cases, upon repeating the determinations, I obtained much lower melting points, which probably indicated incomplete crystallization or no crystallization at all, in the composition range of from 20 to 55% of the isopropyl ester. Thus compositions in this range are actually more resistant to freezing than is indicated by the above table which reflects the use of especially severe conditions imposed in the laboratory in inducing freezing and in measuring melting point.

It will be seen that the present invention is distinguished by its simplicity since it is a simple matter for the manufacturer to blend the pre-formed 2,4–D esters in the indicated proportions or to esterify 2,4–D with a mixture of ethyl and isopropyl alcohols in the proper proportions to give a blend of the esters in the proportions disclosed herein, having due regard for any difference in the rates of esterification of the two alcohols. The invention makes it possible to prepare ester formulations having a remarkably low freezing point without the complications and expense attendant upon the use of extraneous anti-freeze or coupling agents, special aromatic solvents, etc.

In the practice of my invention, I particularly prefer to employ from 30 to 45% of the isopropyl ester and correspondingly from 70 to 55% of the ethyl ester. Mixtures of the two esters only in this range will not freeze at temperatures as low as 4.5° C., when subjected to the above test.

My invention is particularly advantageous because it enables the formulator to successfully market an ester formulation which is based upon the comparatively cheap and readily available petroleum hydrocarbon base oils like fuel oil, kerosene, naphtha, Stoddard solvent, etc. It also makes it possible to market a low-freezing ester formulation based upon such comparatively cheap oils and having a high concentration of active herbicidal ester.

Generally speaking, oil-based formulations made in accordance with my invention contain from 5 to 65% of liquid hydrocarbon formulating oil such as petroleum hydrocarbon base oil and correspondingly from 95 to 35% of the mixed ethyl and isopropyl esters, these percentages being by weight based on the sum of the weights of the oil and the esters. These oil-based formulations will not freeze, by the above test, at temperatures below 0° C., and usually will not freeze at temperatures much lower than —5° C. In many cases the oil and the esters are the only materials present. However, if desired, any conventional dispersing, emulsifying, wetting or surface active agent or agents can be incorporated in the formulation in any desired proportion. Such agents are often desirable because they aid the operator in converting the concentrated formulation into the desired emulsion in water and because they make possible a more thorough wetting of the foliage or bark with the active herbicidal ingredients.

Such emulsifying, wetting or like agents can be incorporated with the mixed esters by themselves, in the case where no formulating oils are used.

The amount and type of emulsifying, surface active or like agent included in the formulation need not be set forth in detail because they are both well within the present skill of the art. In general, however, the amount of such agent will not exceed 10% of the final formulation.

Generally the concentrates made in accordance with my invention will contain at least 30% by weight of the ethyl and isopropyl esters of 2,4-D. More commonly, the concentration of these esters will be at least 50%. The concentration of the esters can range upwardly from these figures to as high as 90 or 95%. In fact the formulation could comprise 100% of the ethyl and isopropyl esters.

It is readily possible by means of my invention to prepare commercially acceptable concentrates containing as much as 8 or 9 pounds of actual 2,4-D acid per Imperial gallon and which exhibit freezing point temperatures 0° C. or even as low as —5° C. using the extremely severe laboratory test conditions described above.

The formulations of my invention contain such relative proportions of the ethyl and isopropyl esters that they have a freezing point so far below the freezing points they would have were they compounded with the ethyl or the isopropyl ester only that they are commercially acceptable. Actually, my invention makes possible a lowering of the freezing point from the value of 14° C. for the ethyl ester of 2,4-D by itself or 27° C. for the isopropyl ester by itself to values of not over 8° C. or even not over 4.5° C., these values referring to mixtures consisting only of the two specified esters.

The following example represents a typical embodiment of my invention:

Example

| | Percent by weight |
|---|---|
| Isopropyl ester of 2,4-D | 16 |
| Ethyl ester of 2,4-D | 30 |
| Emulsifier | 4 |
| Petroleum hydrocarbon base oil | 50 |

The ester mixtures of my invention are particularly advantageous because they exhibit to a very pronounced extent the phenomenon that they do not freeze when cooled to the temperature indicated as the freezing point in the above data but they exhibit extreme supercooling, i. e., remain entirely liquid until cooled far below the point at which they would be expected to become frozen from a consideration of the data given above. This is highly advantageous and was not to have been anticipated.

In the appended claims the statement that the composition will not freeze at a certain temperature means that it will thaw at not above the stated temperature when it is frozen and thawed in accordance with the laboratory technique described above.

Having thus described my invention, what I claim and desire to protect by Letters Patent is:

1. A low-freezing concentrated herbicidal composition of matter in which the active herbicidal ingredient comprises a mixture of the ethyl and isopropyl esters of 2,4-dichlorophenoxyacetic acid in proportions of from 20 to 55% of said isopropyl ester and correspondingly from 80 to 45% of said ethyl ester, said percentages being by weight based on the sum of said esters.

2. A low-freezing concentrated herbicidal composition of matter in which the active herbicidal ingredient comprises a mixture of the ethyl and isopropyl esters of 2,4-dichlorophenoxyacetic acid in proportions of from 30 to 45% of said isopropyl ester and correspondingly from 70 to 55% of said ethyl ester, said percentages being by weight based on the sum of said esters.

3. A concentrated herbicidal composition of matter which will not freeze at temperatures as low as −5° C. and which comprises 5 to 65% of a petroleum hydrocarbon base oil and correspondingly from 95 to 35% of a mixture of the ethyl and isopropyl esters of 2,4-dichlorophenoxyacetic acid in proportions of from 20 to 55% of said isopropyl ester and correspondingly from 80 to 45% of said ethyl ester, said first-named percentages being by weight based on the sum of said oil and said mixture and said last-named percentages being by weight based on the sum of said esters.

4. A concentrated herbicidal composition of matter which will not freeze at temperatures as low as −5° C. and which comprises from 5 to 65% of petroleum hydrocarbon base oil and correspondingly from 95 to 35% of a mixture of the ethyl and isopropyl esters of 2,4-dichlorophenoxyacetic acid in proportions of from 30 to 45% of said isopropyl ester and correspondingly from 70 to 55% of said ethyl ester, said first-named percentages being by weight based on the sum of said oil and said mixture and said last-named percentages being by weight based on the sum of said esters.

References Cited in the file of this patent

UNITED STATES PATENTS

| | | |
|---|---|---|
| 2,543,397 | Allen | Feb. 27, 1951 |
| 2,614,919 | Warren et al. | Oct. 21, 1952 |

OTHER REFERENCES

"Agricultural Chemicals," August 1951, page 36.

"Treatise on Physical Chemistry," by Taylor (Van Nostrand), 2nd edition (1931), vol. I, pages 537 to 542.